(12) United States Patent
LaTulipe et al.

(10) Patent No.: US 12,071,256 B2
(45) Date of Patent: *Aug. 27, 2024

(54) ARCHITECTURES FOR HYBRID-ELECTRIC PROPULSION

(71) Applicant: Pratt & Whitney Canada Corp., Longueuil (CA)

(72) Inventors: Eric LaTulipe, Sainte-Julie (CA); Jean Thomassin, Ste Julie (CA); Xiaoqin Wang, Shanghai (CN); Jean Dubreuil, Boucherville (CA); Luc Dionne, Candiac (CA); Andre Julien, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,376

(22) Filed: Dec. 21, 2022

(65) Prior Publication Data

US 2023/0137264 A1 May 4, 2023

Related U.S. Application Data

(63) Continuation of application No. 16/706,199, filed on Dec. 6, 2019, now Pat. No. 11,535,392.

(Continued)

(51) Int. Cl.
*B64D 35/08* (2006.01)
*B64D 27/02* (2006.01)
(Continued)

(52) U.S. Cl.
CPC ............. *B64D 35/08* (2013.01); *F16H 57/02* (2013.01); *B60Y 2200/50* (2013.01);
(Continued)

(58) Field of Classification Search
CPC ............ B60Y 2200/50; B60Y 2200/92; B60Y 2400/431; B64D 27/02; B64D 27/04;
(Continued)

(56) References Cited

U.S. PATENT DOCUMENTS 6,179,072 B1  1/2001 Hou
6,198,183 B1  3/2001 Baeumel et al.
(Continued)

FOREIGN PATENT DOCUMENTS

BR  MU8701724 U2  6/2009
BR  PI0702882 A2  3/2011
(Continued)

OTHER PUBLICATIONS

PCT International Search Report and Written Opinion dated Apr. 3, 2020, issued during the prosecution of PCT International Patent Application No. PCT/US2019/065449.
(Continued)

*Primary Examiner* — Dapinder Singh
(74) *Attorney, Agent, or Firm* — NORTON ROSE FULBRIGHT CANADA LLP (57) ABSTRACT

A hybrid propulsion system includes a heat engine configured to drive a heat engine shaft. An electric motor is configured to drive an electric motor shaft. A transmission system includes at least one gearbox. The transmission system is configured to receive rotational input power from each of the heat engine shaft and the electric motor shaft and to convert the rotation input power to output power.

16 Claims, 10 Drawing Sheets

Related U.S. Application Data (60) Provisional application No. 62/820,064, filed on Mar. 18, 2019.

(51) Int. Cl.
*F16H 57/02* (2012.01)
*H02K 7/10* (2006.01)
*H02K 7/18* (2006.01)
*H02K 7/20* (2006.01)
*H02K 7/108* (2006.01)
*H02K 7/116* (2006.01)

(52) U.S. Cl.
CPC ..... *B60Y 2200/92* (2013.01); *B60Y 2400/431* (2013.01); *B64D 27/026* (2024.01); *F16H 2057/02034* (2013.01); *F16H 2057/02043* (2013.01); *H02K 7/108* (2013.01); *H02K 7/116* (2013.01); *H02K 7/1823* (2013.01); *H02K 7/20* (2013.01); *Y02T 50/60* (2013.01)

(58) Field of Classification Search
CPC . B64D 35/08; B64D 2027/026; F02B 37/105; F02B 39/06; F02B 39/10; F16H 57/02; F16H 2057/02034; F16H 2057/02043; H02K 7/108; H02K 7/116; H02K 7/1823; H02K 7/20; Y02T 50/60
See application file for complete search history.

(56) References Cited

U.S. PATENT DOCUMENTS

| | | | |
|---|---|---|---|
| 6,335,581 B1 | 1/2002 | Warnke | |
| 6,427,441 B2 | 8/2002 | Wustefeld et al. | |
| 6,537,047 B2 | 3/2003 | Walker | |
| 6,692,395 B2 | 2/2004 | Rodeghiero et al. | |
| 7,022,042 B2 | 4/2006 | Fleytman | |
| 7,098,569 B2 | 8/2006 | Ong et al. | |
| 7,247,967 B2 | 7/2007 | Ionel et al. | |
| 7,303,497 B1 | 12/2007 | Wige | |
| 7,316,629 B2 | 1/2008 | Nakagawa et al. | |
| 7,345,398 B2 | 3/2008 | Purvines et al. | |
| 7,398,946 B1 | 7/2008 | Marshall | |
| 7,418,820 B2 | 9/2008 | Harvey et al. | |
| 7,471,026 B2 | 12/2008 | Bender | |
| 7,503,173 B2 | 3/2009 | Dong et al. | |
| 7,726,426 B2 | 6/2010 | Beck et al. | |
| 7,827,787 B2 | 11/2010 | Cherney et al. | |
| 7,867,122 B2 | 1/2011 | Jones | |
| 7,958,725 B2 | 6/2011 | Elliott | |
| 8,217,544 B2 | 7/2012 | Osada et al. | |
| 8,342,995 B2 | 1/2013 | Grant | |
| 8,382,635 B2 | 2/2013 | Tampieri | |
| 8,435,156 B2 | 5/2013 | Christ | |
| 8,446,121 B1 | 5/2013 | Parsa et al. | |
| 8,471,429 B2 | 6/2013 | Kaiser et al. | |
| 8,495,870 B2 | 7/2013 | Sumiyoshi et al. | |
| 8,531,076 B2 | 9/2013 | Stabenow et al. | |
| 8,535,197 B2 | 9/2013 | Scekic | |
| 8,584,452 B2 | 11/2013 | Lloyd | |
| 8,596,054 B2 | 12/2013 | Law et al. | |
| 8,621,860 B2 | 1/2014 | Hennemann et al. | |
| 8,622,859 B2 | 1/2014 | Babbitt et al. | |
| 8,660,761 B2 | 2/2014 | Anderson et al. | |
| 8,663,047 B2 | 3/2014 | Schroth et al. | |
| 8,710,786 B1 | 4/2014 | Parsa et al. | |
| 8,747,267 B2 | 6/2014 | Sutherland | |
| 8,915,812 B2 | 12/2014 | Haglsperger et al. | |
| 8,943,820 B2 | 2/2015 | Carlton et al. | |
| 8,967,532 B2 | 3/2015 | Vialle | |
| 9,039,566 B2 | 5/2015 | Rudy | |
| 9,051,996 B2 | 6/2015 | During et al. | |
| 9,096,230 B2 | 8/2015 | Ries et al. | |
| 9,102,223 B2 | 8/2015 | Greenwood | |
| 9,109,682 B2 | 8/2015 | Lee et al. | |
| 9,206,885 B2 | 12/2015 | Rekow et al. | |
| 9,261,182 B2 | 2/2016 | Kato et al. | |
| 9,303,727 B2 | 4/2016 | Reimann et al. | |
| 9,343,939 B2 | 5/2016 | Schutten et al. | |
| 9,401,631 B2 | 7/2016 | Wu et al. | |
| 9,447,858 B2 | 9/2016 | Weeramantry et al. | |
| 9,458,864 B2 | 10/2016 | Hyon et al. | |
| 9,546,468 B2 | 1/2017 | Bang | |
| 9,551,400 B2 | 1/2017 | Hiasa et al. | |
| 9,677,466 B2 | 6/2017 | Smaoui et al. | |
| 9,683,585 B2 | 6/2017 | Akiyama et al. | |
| 9,735,638 B2 | 8/2017 | Herz et al. | |
| 9,963,855 B2 | 5/2018 | Jagoda | |
| 9,976,437 B2 | 5/2018 | McCune et al. | |
| 10,000,275 B2 | 6/2018 | Tendola et al. | |
| 10,024,341 B2 | 7/2018 | Zhang et al. | |
| 10,086,946 B1 | 10/2018 | Zywiak et al. | |
| 10,122,227 B1 | 11/2018 | Long | |
| 10,183,744 B2 | 1/2019 | Gamble | |
| 10,287,917 B2 | 5/2019 | Schwarz et al. | |
| 10,374,477 B2 | 8/2019 | Niergarth et al. | |
| 11,535,392 B2 * | 12/2022 | LaTulipe et al. | B64D 35/08 |
| 2003/0217876 A1 * | 11/2003 | Severinsky et al. | B60K 1/00 180/65.2 |
| 2005/0178893 A1 | 8/2005 | Miller et al. | |
| 2005/0258306 A1 | 11/2005 | Barocela et al. | |
| 2006/0016196 A1 | 1/2006 | Epstein | |
| 2006/0016197 A1 | 1/2006 | Epstein | |
| 2006/0032225 A1 * | 2/2006 | Dyne et al. | F02B 33/44 60/607 |
| 2006/0056971 A1 | 3/2006 | D'Anna | |
| 2006/0237583 A1 | 10/2006 | Fucke et al. | |
| 2007/0170307 A1 | 7/2007 | de la Cierva Hoces | |
| 2007/0191180 A1 * | 8/2007 | Yang | B60W 10/02 477/5 |
| 2007/0264124 A1 | 11/2007 | Mueller et al. | |
| 2008/0141921 A1 | 6/2008 | Hinderks | |
| 2008/0145221 A1 | 6/2008 | Sun et al. | |
| 2009/0019852 A1 * | 1/2009 | Inoue | F02B 39/12 310/40 R |
| 2009/0050103 A1 | 2/2009 | Heaton | |
| 2009/0229897 A1 | 9/2009 | Yutani et al. | |
| 2010/0167601 A1 * | 7/2010 | Rzadki et al. | B63H 21/20 440/1 |
| 2010/0264724 A1 | 10/2010 | Nelson et al. | |
| 2010/0285747 A1 | 11/2010 | Bauer et al. | |
| 2011/0108663 A1 | 5/2011 | Westenberger | |
| 2011/0215584 A1 | 9/2011 | Prokopich | |
| 2011/0236218 A1 | 9/2011 | Russ et al. | |
| 2011/0243566 A1 | 10/2011 | Truong | |
| 2011/0256973 A1 | 10/2011 | Werner et al. | |
| 2011/0266995 A1 | 11/2011 | Winfield et al. | |
| 2012/0025032 A1 | 2/2012 | Hopdjanian et al. | |
| 2012/0137684 A1 | 6/2012 | Yogev et al. | |
| 2012/0168557 A1 | 7/2012 | Edelson et al. | |
| 2012/0227389 A1 | 9/2012 | Hinderks | |
| 2012/0239228 A1 | 9/2012 | Vos | |
| 2012/0327921 A1 | 12/2012 | Schirrmacher et al. | |
| 2013/0026304 A1 | 1/2013 | Wang | |
| 2013/0082135 A1 | 4/2013 | Moret | |
| 2013/0119841 A1 | 5/2013 | Graf et al. | |
| 2013/0168489 A1 | 7/2013 | McIntee | |
| 2013/0181088 A1 | 7/2013 | Casado Montero et al. | |
| 2013/0227950 A1 | 9/2013 | Anderson et al. | |
| 2013/0287574 A1 | 10/2013 | Ebbesen et al. | |
| 2013/0300120 A1 | 11/2013 | Podrog | |
| 2013/0341934 A1 | 12/2013 | Kawanishi | |
| 2014/0010652 A1 | 1/2014 | Suntharalingam et al. | |
| 2014/0027568 A1 | 1/2014 | Fleddermann et al. | |
| 2014/0054411 A1 | 2/2014 | Connaulte et al. | |
| 2014/0117148 A1 | 5/2014 | Dyrla et al. | |
| 2014/0203739 A1 | 7/2014 | Chantriaux et al. | |
| 2014/0248168 A1 | 9/2014 | Chantriaux et al. | |
| 2014/0283519 A1 | 9/2014 | Mariotto et al. | |
| 2014/0318132 A1 | 10/2014 | Podrog | |
| 2015/0028594 A1 | 1/2015 | Mariotto | |
| 2015/0076949 A1 | 3/2015 | Alim | |
| 2015/0083852 A1 | 3/2015 | Moser et al. | |
| 2015/0151844 A1 | 6/2015 | Anton et al. | |

(56) References Cited

U.S. PATENT DOCUMENTS

| | | |
|---|---|---|
| 2015/0274306 A1 | 10/2015 | Sheridan |
| 2015/0285165 A1 | 10/2015 | Steinwandel et al. |
| 2015/0311755 A1 | 10/2015 | Hiebl et al. |
| 2016/0010589 A1 | 1/2016 | Rolt |
| 2016/0016670 A1 | 1/2016 | Sautreuil et al. |
| 2016/0076446 A1 | 3/2016 | Bailey Noval et al. |
| 2016/0218930 A1 | 7/2016 | Toillon et al. |
| 2016/0305470 A1 | 10/2016 | Remer et al. |
| 2017/0016398 A1 | 1/2017 | Thiriet et al. |
| 2017/0016399 A1 | 1/2017 | Bedrine et al. |
| 2017/0072755 A1 | 3/2017 | Zhou et al. |
| 2017/0096233 A1 | 4/2017 | Mercier-Calvairac et al. |
| 2017/0152055 A1 | 6/2017 | Mercier-Calvairac et al. |
| 2017/0203839 A1 | 7/2017 | Giannini et al. |
| 2017/0225794 A1 | 8/2017 | Waltner |
| 2017/0240273 A1 | 8/2017 | Yuen |
| 2017/0241347 A1 | 8/2017 | Marconi et al. |
| 2017/0284408 A1 | 10/2017 | Ricordeau et al. |
| 2017/0305541 A1 | 10/2017 | Vallart et al. |
| 2017/0320584 A1 | 11/2017 | Menheere |
| 2017/0320585 A1 | 11/2017 | Armstrong et al. |
| 2017/0328282 A1 | 11/2017 | Jensen et al. |
| 2017/0370344 A1 | 12/2017 | Kassianoff |
| 2018/0002025 A1 | 1/2018 | Lents et al. |
| 2018/0003071 A1 | 1/2018 | Lents et al. |
| 2018/0003072 A1 | 1/2018 | Lents et al. |
| 2018/0003109 A1 | 1/2018 | Ents et al. |
| 2018/0009542 A1 | 1/2018 | Kuster |
| 2018/0118335 A1 | 5/2018 | Gamble et al. |
| 2018/0127103 A1 | 5/2018 | Cantemir |
| 2018/0163558 A1 | 6/2018 | Vondrell et al. |
| 2018/0194483 A1 | 7/2018 | Schwöller |
| 2018/0251226 A1 | 9/2018 | Fenny et al. |
| 2018/0252115 A1 | 9/2018 | Himmelmann et al. |
| 2018/0265206 A1 | 9/2018 | Himmelmann |
| 2018/0266329 A1 | 9/2018 | Mackin |
| 2018/0273197 A1 | 9/2018 | Chang et al. |
| 2018/0319483 A1 | 11/2018 | Mayer et al. |
| 2018/0339786 A1 | 11/2018 | Thomassin et al. |
| 2018/0346111 A1 | 12/2018 | Karem et al. |

FOREIGN PATENT DOCUMENTS

| | | |
|---|---|---|
| BR | PI0622106 A2 | 12/2011 |
| BR | PI1104839 A2 | 11/2012 |
| DE | 102013209538 A1 | 11/2014 |
| EP | 2226487 A2 | 9/2010 |
| EP | 2332235 A2 | 6/2011 |
| EP | 2478608 A2 | 7/2012 |
| EP | 2238362 B1 | 3/2015 |
| EP | 2962885 A1 | 1/2016 |
| EP | 3292041 A1 | 3/2018 |
| EP | 3327526 A1 | 5/2018 |
| EP | 3327527 A1 | 5/2018 |
| EP | 3350895 A1 | 7/2018 |
| EP | 3405654 A1 | 11/2018 |
| EP | 3423354 A1 | 1/2019 |
| EP | 3556659 A1 | 10/2019 |
| JP | 2006231974 A | 9/2006 |
| JP | 2006270778 A | 10/2006 |
| JP | 2006290187 A | 10/2006 |
| JP | 2007137423 A | 6/2007 |
| JP | 4215012 B2 | 1/2009 |
| JP | 2009534928 A | 9/2009 |
| JP | 2011516334 A | 5/2011 |
| JP | 4973256 B2 | 7/2012 |
| JP | 2013193533 A | 9/2013 |
| JP | 5415400 B2 | 2/2014 |
| JP | 2014076771 A | 5/2014 |
| JP | 2014159255 A | 9/2014 |
| JP | 2015077089 A | 4/2015 |
| JP | 2015077091 A | 4/2015 |
| JP | 2015137092 A | 7/2015 |
| JP | 5867219 B2 | 2/2016 |
| JP | 2017074804 A | 4/2017 |
| JP | 2017150665 A | 8/2017 |
| JP | 6199496 B2 | 9/2017 |
| JP | 2017165131 A | 9/2017 |
| JP | 6213494 B2 | 10/2017 |
| JP | 2017534514 A | 11/2017 |
| JP | 6376042 B2 | 8/2018 |
| JP | 6397447 B2 | 9/2018 |
| JP | 6430885 B2 | 11/2018 |
| JP | 6433492 B2 | 12/2018 |
| KR | 20070039699 A | 4/2007 |
| KR | 20080086714 A | 9/2008 |
| KR | 20080005377 U | 11/2008 |
| KR | 20090110373 A | 10/2009 |
| KR | 20110032973 A | 3/2011 |
| KR | 20110087661 A | 8/2011 |
| KR | 20120140229 A | 12/2012 |
| KR | 20130006379 A | 1/2013 |
| KR | 101277645 B1 | 6/2013 |
| KR | 20130142491 A | 12/2013 |
| KR | 101438289 B1 | 9/2014 |
| KR | 101572184 B1 | 11/2015 |
| KR | 101659783 B1 | 9/2016 |
| KR | 20160143599 A | 12/2016 |
| KR | 20170004299 A | 1/2017 |
| KR | 101713800 B1 | 3/2017 |
| KR | 101797011 B1 | 11/2017 |
| WO | 2007086213 A1 | 8/2007 |
| WO | 2011005066 A2 | 1/2011 |
| WO | 2011107718 A1 | 9/2011 |
| WO | 2011144188 A1 | 11/2011 |
| WO | 2014108125 A1 | 7/2014 |
| WO | 2014134506 A1 | 9/2014 |
| WO | 2015107368 A1 | 7/2015 |
| WO | 2015145036 A1 | 10/2015 |
| WO | 2016074600 A1 | 5/2016 |
| WO | 2017114643 A1 | 7/2017 |
| WO | 2018044757 A1 | 3/2018 |
| WO | 2018106137 A2 | 6/2018 |
| WO | 2018191769 A1 | 10/2018 |
| WO | 2018211227 A1 | 11/2018 |

OTHER PUBLICATIONS

PCT International Search Report and Written Opinion dated Sep. 25, 2020, issued during the prosecution of PCT International Patent Application No. PCT/US2019/064999.

Extended European Search Report for European Patent Application No. EP19917818.7, dated Oct. 17, 2022.

* cited by examiner

ARCHITECTURES FOR HYBRID-ELECTRIC PROPULSION

CROSS REFERENCE TO RELATED APPLICATIONS

This application is a continuation of U.S. patent application Ser. No. 16/706,199 filed Dec. 6, 2019, which claims the benefit of and priority to U.S. Provisional Patent Application No. 62/820,064, filed Mar. 18, 2019. The disclosures of these two prior applications are hereby incorporated by reference in their entirety.

BACKGROUND OF THE INVENTION

1. Field of the Invention

The present disclosure relates to aircraft engines, and more particularly to hybrid aircraft engines.

2. Description of Related Art

Aircraft engines vary in efficiency and function over a plurality of parameters, such as thrust requirements, air temperature, air speed, altitude, and the like. Aircraft require the most thrust at take-off, wherein the demand for engine power is the heaviest. However, during the remainder of the mission, the aircraft engines often do not require as much thrust as during take-off. The size and weight of the engines allows them to produce the power needed for take-off, however after take-off the engines are in effect over-sized for the relatively low power required to produce thrust for cruising in level flight.

The conventional techniques have been considered satisfactory for their intended purpose. However, there is an ever present need for improved aircraft engines. This disclosure provides a solution for this need.

SUMMARY OF THE INVENTION

A hybrid propulsion system includes a heat engine configured to drive a heat engine shaft. An electric motor is configured to drive an electric motor shaft. A transmission system includes at least one gearbox. The transmission system is configured to receive rotational input power from each of the heat engine shaft and the electric motor shaft and to convert the rotation input power to output power.

The at least one gearbox can include a combining gearbox connecting to the heat engine shaft and to the electric motor shaft to combine rotational input power from the heat engine and electric motor for providing rotational output power to an output shaft. A turbine gearbox can be included, wherein the turbine gearbox is connected between the heat engine shaft and a shaft for driving a turbine and a compressor to drive the turbine and compressor at a different rotational speed from the heat engine.

The at least one gearbox can include a combining gearbox connecting to the heat engine shaft, the electric motor shaft, and a shaft for driving a turbine and compressor, to combine rotational input power from the heat engine and electric motor for providing rotational output power to an output shaft and to drive the turbine and compressor. The turbine and compressor can both be on one side of the combining gearbox. It is also contemplated that the turbine and compressor can be connected on opposite sides of the combining gearbox.

The heat engine shaft and the electric motor shaft can be connected for common rotation. The at least one gearbox can include a reduction gearbox connected to a common output shaft of the electric motor and the heat engine, and a turbine gearbox can be connected between the heat engine shaft and a shaft for driving a turbine and a compressor to drive the turbine and compressor at a different rotational speed from the heat engine and electric motor.

The heat engine shaft and electric motor shaft can be concentric with a shaft for rotation of the turbine and compressor, wherein the at least one gearbox includes a reduction gearbox connected to each of the heat engine shaft and the electric motor shaft and to the shaft for rotation of the turbine and compressor.

In another aspect, the heat engine shaft and the electric motor shaft can be connected for common rotation. The at least one gearbox can include a combining gearbox connecting to a common output shaft of the electric motor and the heat engine and a shaft for driving a turbine and compressor, to combine rotational input power from the heat engine and electric motor for providing rotational output power to an output shaft and to drive the turbine and compressor. The turbine and compressor can both be on one side of the combining gearbox. It is also contemplated that the turbine and compressor can be connected on opposite sides of the combining gearbox.

The at least one gearbox can include a combining gearbox connecting to the heat engine shaft and to the electric motor shaft to combine rotational input power from the heat engine and electric motor for providing rotational output power to an output shaft. A turbine driver motor can be connected to a shaft for driving a turbine and a compressor to drive the turbine and compressor at a different rotational speed ratio from the heat engine and electric motor.

In another aspect, the heat engine shaft and the electric motor shaft can be connected for common rotation. The at least one gearbox can include a reduction gearbox connected to a common output shaft of the electric motor and the heat engine. A turbine driver motor can be connected to a shaft for driving a turbine and a compressor to drive the turbine and compressor at a different rotational speed ratio from the heat engine and electric motor.

In another aspect, the heat engine shaft and the electric motor shaft can be connected for common rotation. The at least one gearbox can include a reduction gearbox connected to a common output shaft of the electric motor and the heat engine. A turbine gearbox can be connected through a clutch between the heat engine shaft and a shaft for driving a turbine and a compressor to drive the turbine and compressor at a different rotational speed from the heat engine and electric motor when the clutch is engaged. The shaft for driving the turbine and compressor can be connected to a turbine driver motor to drive the turbine and compressor independently from the heat engine and electric motor when the clutch is disengaged.

In another aspect, the heat engine shaft and electric motor shaft can be concentric with a shaft for rotation of a turbine and compressor. The at least one gearbox can include a reduction gearbox connected to each of the heat engine shaft and the electric motor shaft. A clutch in the shaft for rotation of the turbine and compressor can connect between the reduction gearbox a turbine driver motor connected to the shaft for rotation of the turbine and a compressor to drive the turbine and compressor with the reduction gearbox when the clutch is engaged, and to drive the turbine and compressor independently from the heat engine and electric motor when the clutch is disengaged.

In another aspect, the heat engine shaft and the electric motor shaft can be connected for common rotation. The at least one gearbox can include a reduction gearbox connected to a common output shaft of the electric motor and the heat engine. A clutch can connect between the reduction gearbox and a turbine driver motor connected to a shaft for driving a turbine and a compressor to drive the turbine and compressor with rotational power from the heat engine and electric motor when the clutch is engaged, and to drive the turbine and compressor independently from the heat engine and electric motor when the clutch is disengaged.

In another aspect, the heat engine shaft and the electric motor shaft can be connected for common rotation. The at least one gearbox can include a combining gearbox connecting to a common output shaft of the electric motor and the heat engine, and a shaft of a turbine to combine rotational input power from the heat engine, electric motor, and turbine for providing rotational output power to an output shaft. A reduction gearbox can be connected to the output shaft, wherein a compressor is connected to be driven on the output shaft.

In another aspect, the heat engine shaft and the electric motor shaft can be connected for common rotation. The at least one gearbox can include a reduction gearbox connected to a common output shaft of the electric motor and the heat engine. A turbine gearbox can be connected between the heat engine shaft and a shaft of a turbine so the turbine can rotate at a different rotational speed from the heat engine and electric motor. A compressor can be connected to the reduction gearbox through a compressor shaft concentric with the common output shaft so the compressor can be driven at a different rotational speed from the common output shaft.

In another aspect, the heat engine shaft and the electric motor shaft can be connected for common rotation. The at least one gearbox can include a super position gearbox connecting to a common output shaft of the electric motor and the heat engine, and a shaft for driving a turbine and compressor to combine rotational input power from the heat engine and electric motor for providing rotational output power to an output shaft and to drive the turbine and compressor. The super position gearbox can be configured so speed ratio between the common output shaft and the shaft for driving the turbine and compressor can vary.

A turbine can be connected to the heat engine to be driven by exhaust form the heat engine, and a generator can be connected to be driven by the turbine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
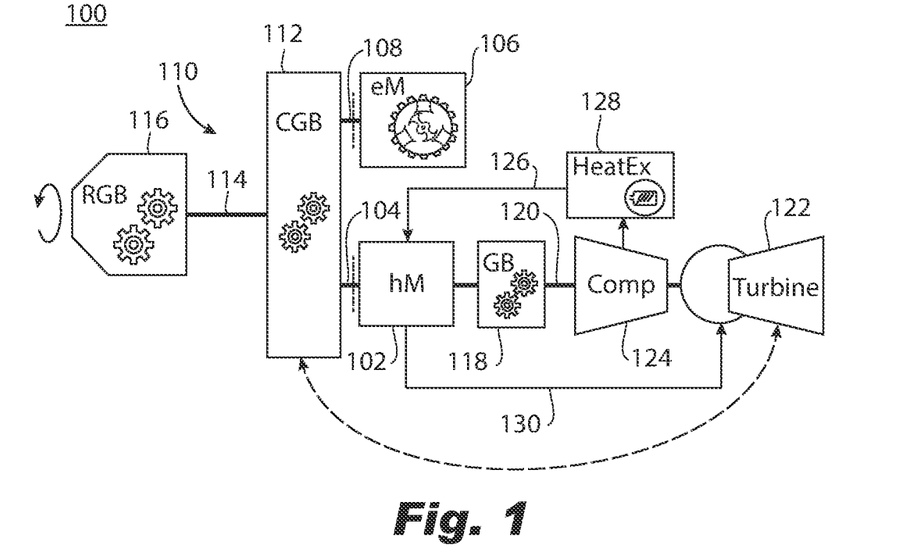
FIG. 1 is a schematic view of an exemplary embodiment of a hybrid propulsion system constructed in accordance with the present disclosure, showing a first gearbox arrangement.

Reference will now be made to the drawings wherein like reference numerals identify similar structural features or aspects of the subject disclosure. For purposes of explanation and illustration, and not limitation, a partial view of an exemplary embodiment of a hybrid propulsion system in accordance with the disclosure is shown in FIG. 1 and is designated generally by reference character 100. Other embodiments of hybrid propulsion systems in accordance with the disclosure, or aspects thereof, are provided in FIGS. 2-15, as will be described. The systems and methods described herein can be used to provide hybrid propulsion, e.g., for improving fuel efficiency in aircraft.

The hybrid propulsion system 100 includes a heat engine (or motor) 102 configured to drive a heat engine shaft 104. An electric motor 106 is configured to drive an electric motor shaft 108. A transmission system 110 includes at least one gearbox. The transmission system 110 is configured to receive rotational input power from each of the heat engine shaft 104 and the motor shaft 108 and to convert the rotation input power to output power, as indicated by the circular arrow in FIG. 1.

The at least one gearbox includes a combining gearbox 112 connecting to the heat engine shaft 104 and to the motor shaft 108 to combine rotational input power from the heat engine 102 and electric motor 106 for providing rotational output power to an output shaft 114, which can drive a reduction gearbox 116 for turning an aircraft propeller, fan, or any other suitable type of air mover for example. A turbine gearbox 118 is included, which is connected between the heat engine shaft 104 and a shaft 120 for driving a turbine 122 and a compressor 124 to drive the turbine 122 and compressor 124 at a different rotational speed from the heat engine 102. For example, through the turbine gearbox 118, the heat engine 102 can run at 8000 revolutions per minute (RPM), the heat engines exhaust can be recovered by the turbine 122 to drive the compressor 120 at 35,000 RPM. The turbine gearbox 118 can be a two speed transmission or constant velocity transmission (CVT) which can eliminate the need for a variable inlet guide vane (VIGV) controlling the compressor 124. It is also contemplated that the turbine 122 and compressor 124 can separately connect to the turbine gear box 118, e.g., using a concentric shaft for the compressor such as the shaft 1246 shown in FIG. 14, so that the turbine 122 and compressor 124 can rotate at different rotational speeds. These types of turbine gearbox can apply to each of the turbine gearboxes described below, even if not specifically repeated.

Those skilled in the art will readily appreciate that while described herein in the context of driving the turbine 122 and compressor 124, that the turbine 122 can actually add power to the shaft 120 and therefore cooperates with the heat engine 102 to drive the combining gearbox 112, however, in configurations herein where the turbine 122 and compressor 124 spin at a common speed the compressor 124 and turbine 122 are collectively referred to herein as driven.

The compressor 120 compresses air and supplies the compressed air to the heat engine 102 through the air line 126, which includes heat exchanger 128 for cooling the compressed air. After combustion in the heat engine 102, the combustion products are supplied through a combustion products line 130 to the turbine 122, which extracts power from the compressed combustion products before exhausting them. The configurations shown in FIGS. 2-15 also include similar air lines 126, heat exchangers 128, and combustion products lines 130, and the details for such are not repeated below for each Figure. Also, unless specified otherwise, the configurations in each of FIGS. 2-15 include an output shaft 114 connecting between a combining gearbox (e.g. combining gearbox 112) and reduction gearbox 116, the details of which will not be repeated below for each Figure. The electric motor 106 can be powered to boost horse power, e.g., for take-off, in parallel with the heat motor 102, and can be powered down, e.g., for cruising in level flight, where only the heat motor 102 is needed for power.

Figure 13:
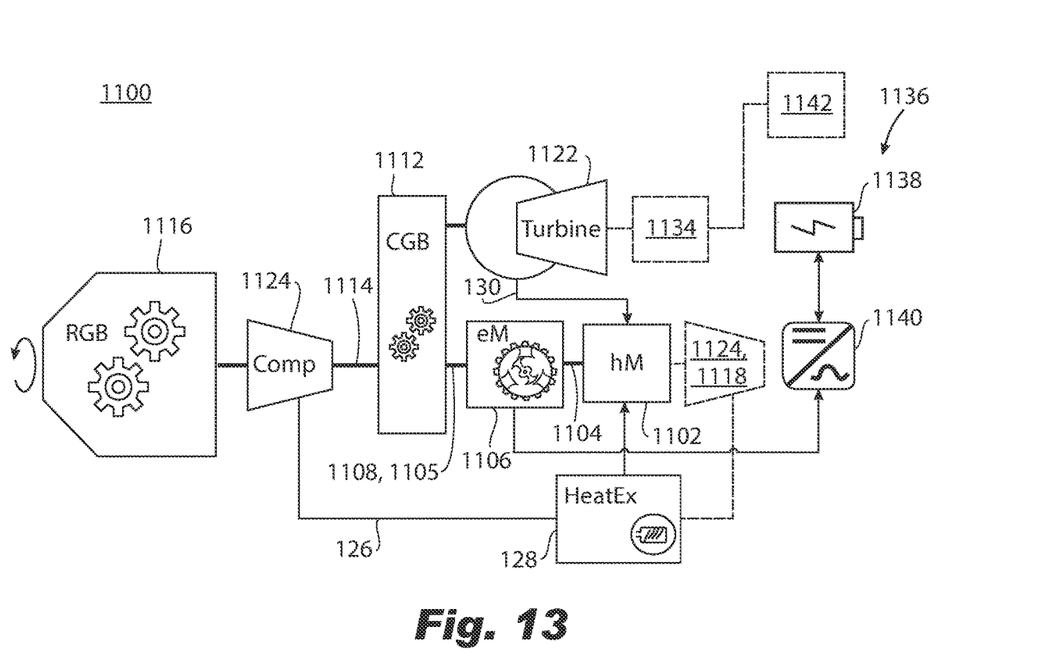
FIG. 13 is a schematic view of an exemplary embodiment of a hybrid propulsion system constructed in accordance with the present disclosure, showing a thirteenth gearbox arrangement.

It is also contemplated that the electric motor 106 can be used as a generator to recharge the battery, e.g. source 1138 of FIG. 13, when power is available from the heat engine 102 or form wind milling the propeller to drive the reduction gear box 116. The compressor 124 and turbine 122 improve the thermal efficiency of the heat engine 102. Similar benefits are derived with the configurations described below with respect to FIGS. 2-15. The dashed line in FIG. 1 schematically indicates that the turbine 122 can optionally be moved to connect directly to the combining gearbox 112, much as described below with respect to FIG. 13, which switch in turbine position can also be applied to other arrangements described below wherein the compressor and turbine are shown and described as being on a common shaft.

Figure 2:
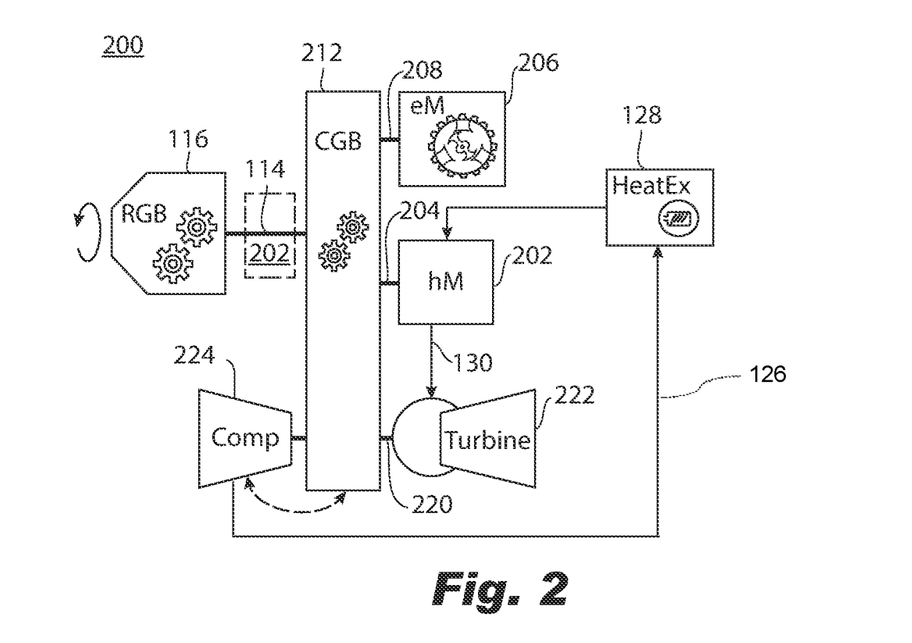
FIG. 2 is a schematic view of an exemplary embodiment of a hybrid propulsion system constructed in accordance with the present disclosure, showing a second gearbox arrangement.
Figure 3:
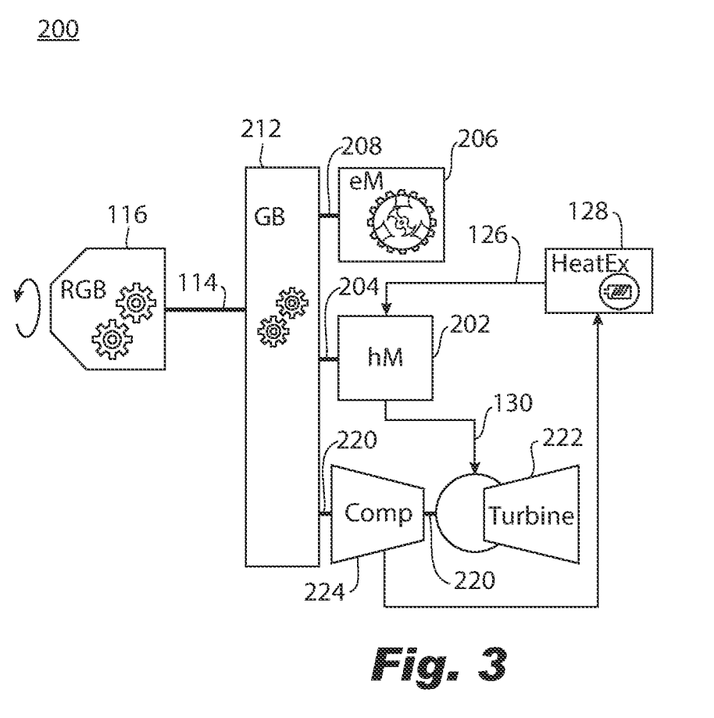
FIG. 3 is a schematic view of an exemplary embodiment of a hybrid propulsion system constructed in accordance with the present disclosure, showing a third gearbox arrangement.

With reference now to FIG. 2, a system 200 includes a combining gearbox 212 connecting to the heat engine shaft 204, the motor shaft 208, and a shaft 220 for driving the turbine 222 and compressor 224. The combining gearbox 212 combines rotational input power from the heat engine (or motor) 202 and electric motor 206 for providing rotational output power to an output shaft 114 and to drive the turbine 222 and compressor 224. While connected on a common shaft 220, the turbine 222 and compressor 224 can be connected on opposite sides of the combining gearbox 212 as shown in FIG. 2. It is also contemplated that the turbine 222 and compressor 224 can both be connected on one side of the combining gearbox 212, as shown in FIG. 3. The portion of the combining gearbox 212 that drives the shaft 220 can be a two speed transmission or constant velocity transmission (CVT) which can eliminate the need for a variable inlet guide vane (VIGV) controlling the compressor 224. This applies to arrangements described below wherein the turbine and compressor connect directly to a combined gearbox, even if not specifically repeated.

Figure 4:
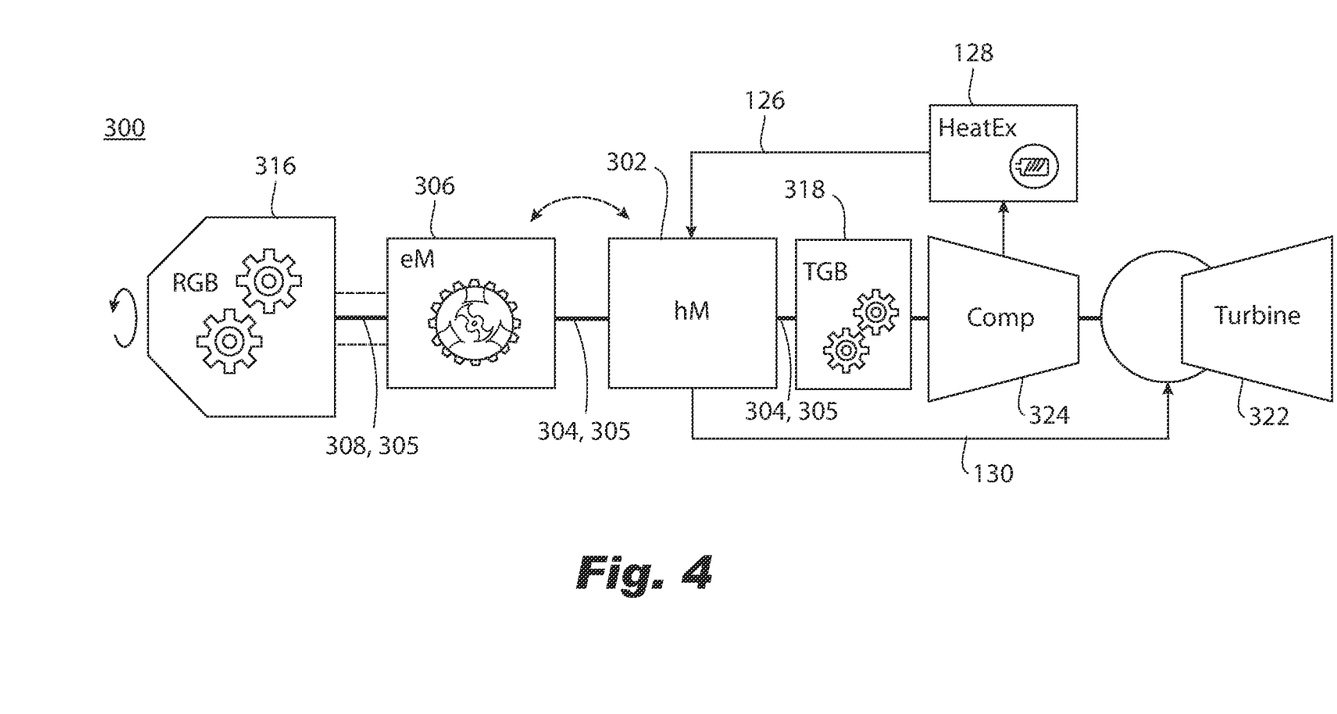
FIG. 4 is a schematic view of an exemplary embodiment of a hybrid propulsion system constructed in accordance with the present disclosure, showing a fourth gearbox arrangement.

With reference now to FIG. 4, a system 300 is shown wherein the heat engine shaft 304 and the electric motor shaft 308 are connected for common rotation. A reduction gearbox 316, e.g. for ultimately outputting power to a propeller, is connected to a common output shaft 305 of the electric motor 306 and the heat engine 302. A turbine gearbox 332 is connected between the heat engine shaft 304 and a shaft 320 for rotation of the turbine 322 and compressor 324 at a different rotational speed from the heat engine 302 and electric motor 306. The broken line in FIG. 4 indicates that the position of the heat engine 302 and electric motor 306 can be reversed on the common shaft 305. If there is a requirement to guarantee power from one of the heat engine 302 or electric motor 306 in the event of stoppage of the other, each of the heat engine 302 and electric motor can be connected to the reduction gearbox 316 through a concentric shaft, e.g. as indicated by the broken lines between the electric motor 306 and the reduction gear box 316. The same applies to other configurations herein where the heat engine and electric motor are shown and described as having a common output shaft.

Figure 5:
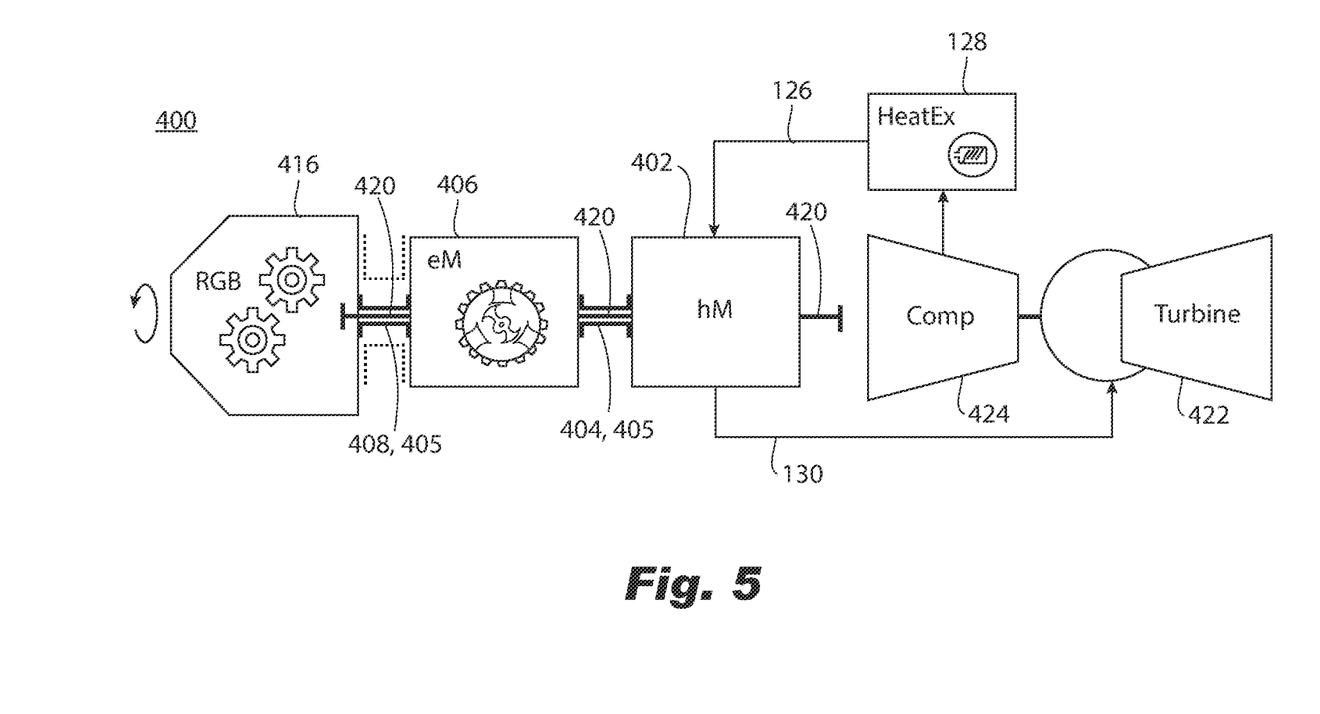
FIG. 5 is a schematic view of an exemplary embodiment of a hybrid propulsion system constructed in accordance with the present disclosure, showing a fifth gearbox arrangement.

With reference now to FIG. 5, in the system 400, the heat engine shaft 404 and electric motor shaft 408 are concentric with a shaft 420 for rotation of the turbine 422 and compressor 424. The heat engine shaft 404 and electric motor shaft 408 can be a common shaft 405 as shown in FIG. 5, or can themselves be concentric with one another as indicated by the broken lines in FIG. 5. A reduction gearbox 416 is connected to each of the heat engine shaft 404 and the electric motor shaft 408, e.g., for driving a propeller with rotational input from the heat engine 402 and electric motor

406. The reduction gearbox 416 connects to a shaft 420 for rotation of the turbine 422 and compressor 424.

Figure 6:
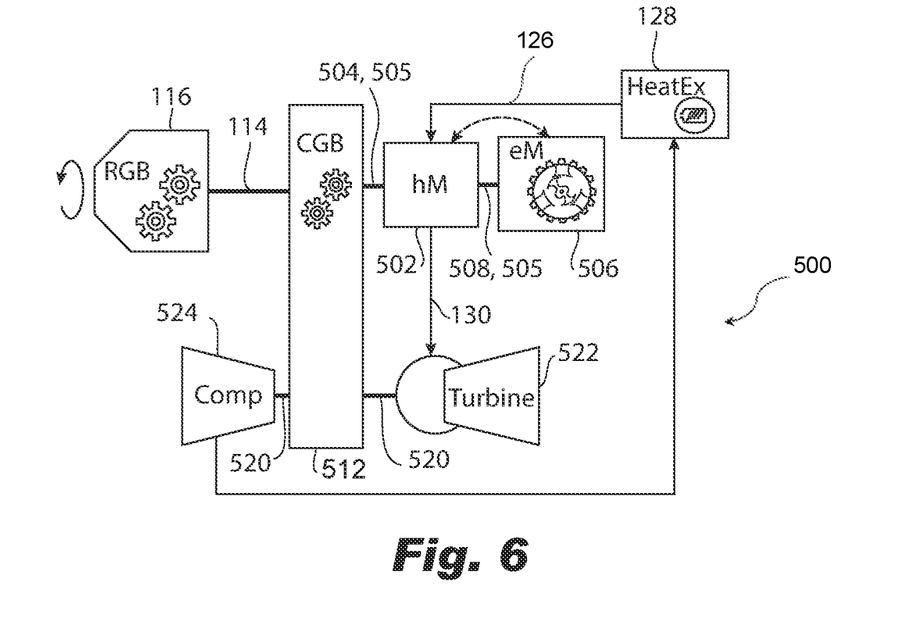
FIG. 6 is a schematic view of an exemplary embodiment of a hybrid propulsion system constructed in accordance with the present disclosure, showing a sixth gearbox arrangement.
Figure 7:
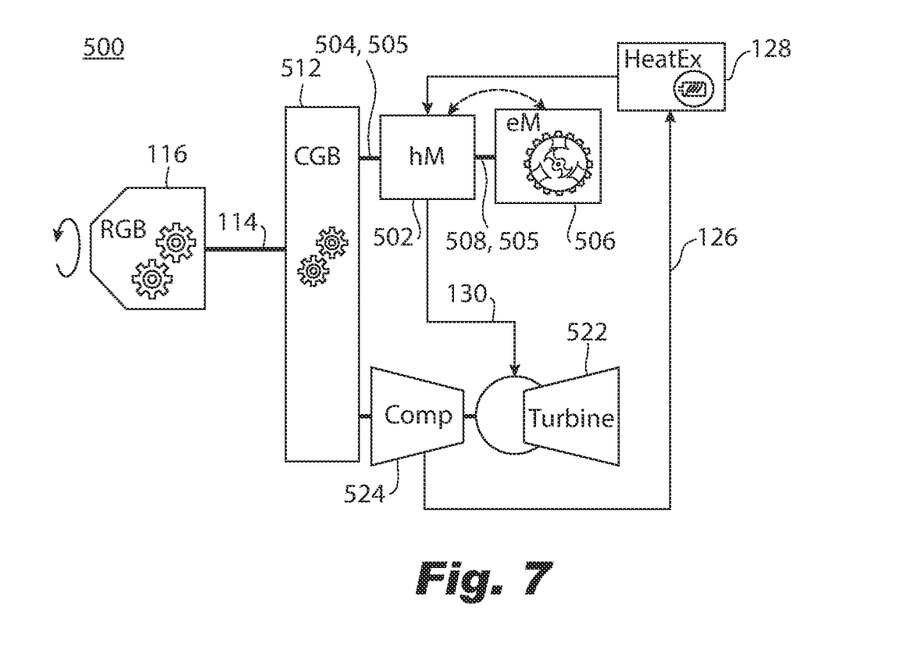
FIG. 7 is a schematic view of an exemplary embodiment of a hybrid propulsion system constructed in accordance with the present disclosure, showing a seventh gearbox arrangement.

With reference now to FIG. 6, a system 500 has a heat engine shaft 504 and the electric motor shaft 508 connected for common rotation. A combining gearbox 512 connects to the common output shaft 505 of the electric motor 506 and the heat engine 502 and a shaft 520 for driving a turbine 522 and compressor 524, to combine rotational input power from the heat engine 502 and electric motor 506 for providing rotational output power to an output shaft 114 and to drive the turbine 522 and compressor 524. The turbine 522 and compressor 524 are connected on opposite sides of the combining gearbox 512. As shown in FIG. 7, it is also contemplated that the turbine 522 and compressor 524 can both be on one side of the combining gearbox 512. The broken lines in FIGS. 6 and 7 schematically indicate that the positions of the heat motor 502 and electric motor 506 can be switched.

Figure 8:
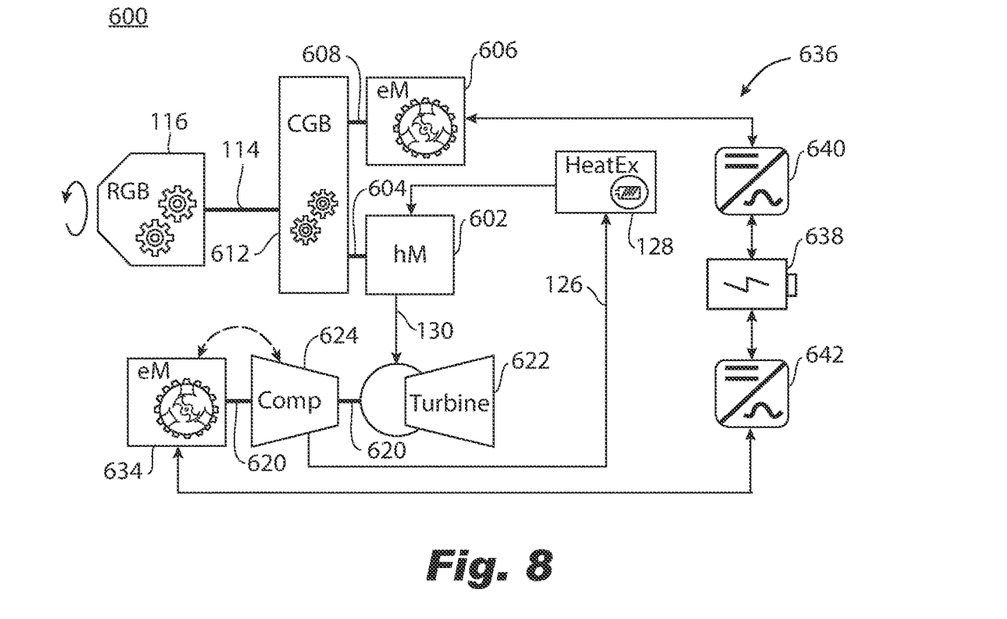
FIG. 8 is a schematic view of an exemplary embodiment of a hybrid propulsion system constructed in accordance with the present disclosure, showing an eighth gearbox arrangement.

Referring now to FIG. 8, a system 600 includes a combining gearbox 612 connecting to the heat engine shaft 604 and to the electric motor shaft 608 to combine rotational input power from the heat engine 602 and electric motor 606 for providing rotational output power to an output shaft 114. A turbine driver motor/generator 634 is connected to a shaft 620 for driving a turbine 622 and a compressor 624 to drive the turbine 622 and compressor 624 at a different rotational speed ratio from the heat engine 602 and electric motor 606. The compressor 624 can therefore be a variable speed compressor. An electrical system 636 includes a storage 638, e.g., a battery, battery bank, capacitor, capacitor bank, super capacitor or super capacitor bank, flywheel or flywheel bank, or the like, is connected to a first inverter/rectifier component 640 for supplying power from the storage 638 to drive the electric motor 606 or in an energy recovery mode, to store into the storage 638 energy generated by driving the electric motor 606 in a generator mode. The electrical system 636 includes a second invert/rectifier component 642 for supplying power to drive the turbine driver motor 634, or to recover energy into the storage 638 from the turbine drive motor 634 if run in a generator mode. The broken line in FIG. 8 schematically indicates that the position of the motor 634 and compressor can be switched on the shaft 620. FIGS. 9, 10, 11, and 12 each show similar electrical systems 636 and the description thereof is not repeated below.

Figure 9:
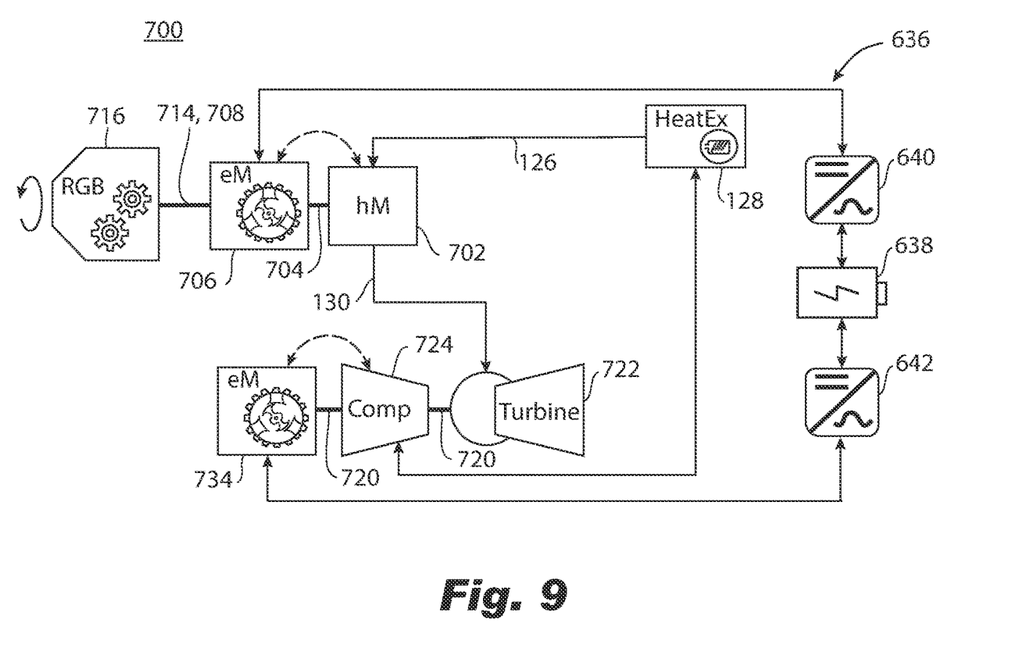
FIG. 9 is a schematic view of an exemplary embodiment of a hybrid propulsion system constructed in accordance with the present disclosure, showing a ninth gearbox arrangement.

With reference now to FIG. 9, a system 700 has the heat engine shaft 704 and the electric motor shaft 108 are connected for common rotation. A reduction gearbox 716 connected to a common output shaft 714 of the electric motor 706 and the heat engine 702. A turbine driver motor 734 is connected to a shaft 720 for driving a turbine 722 and a compressor 724 at a different rotational speed from the heat engine 702 and electric motor 706. The broken arrows in FIG. 9 schematically indicate that the position of the heat engine 702 and the electric motor 706 can be switched on the common shaft 714, and that the positions of the motor 734 and compressor 724 can be switched on the shaft 720.

Figure 10:
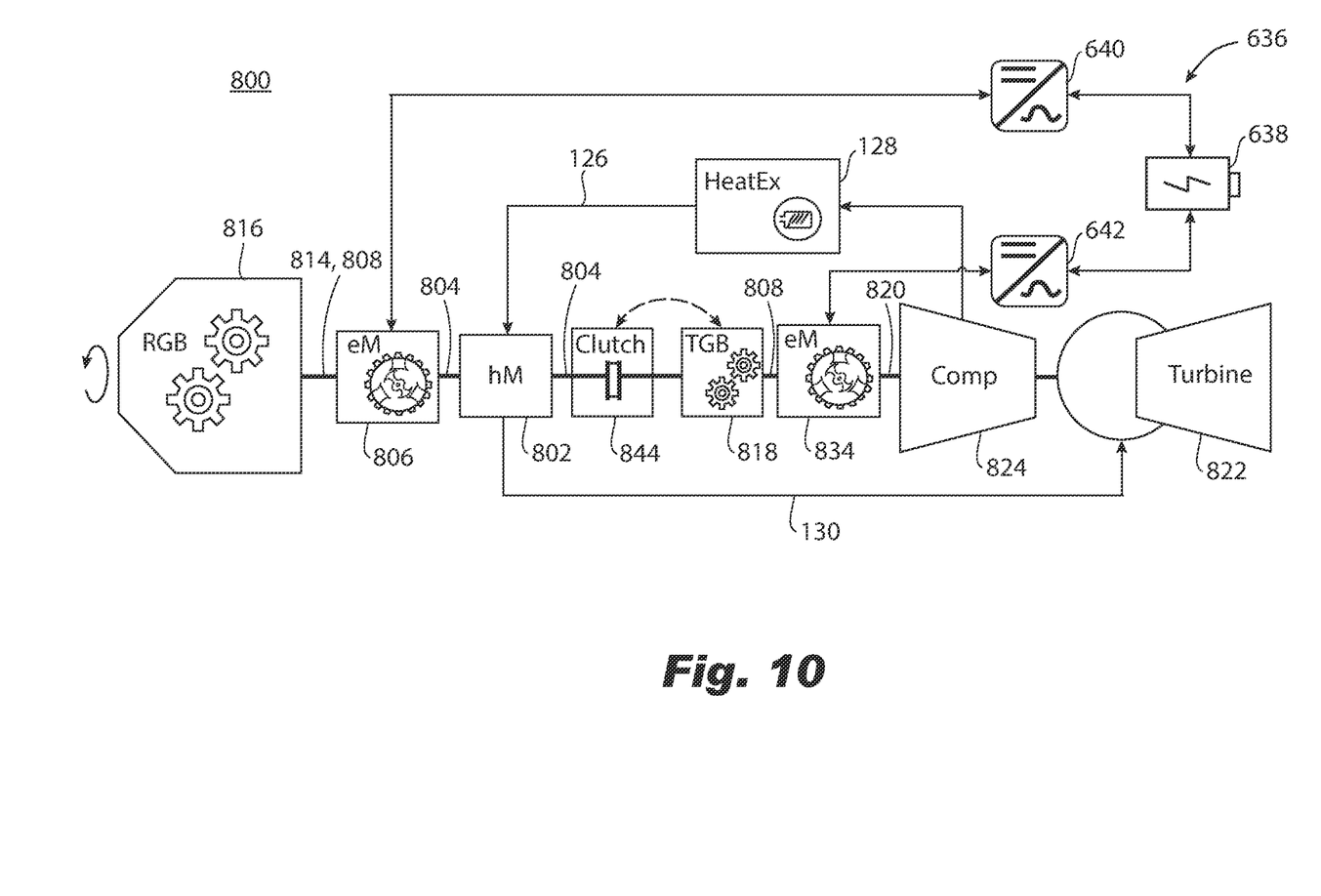
FIG. 10 is a schematic view of an exemplary embodiment of a hybrid propulsion system constructed in accordance with the present disclosure, showing a tenth gearbox arrangement.

Referring now to FIG. 10, in the system 800 the heat engine shaft 804 and the electric motor shaft 808 are connected for common rotation. A reduction gearbox 816 is connected to a common output shaft 814 of the electric motor 806 and the heat engine 802. A turbine gearbox 818 is connected through a clutch 844 between the heat engine shaft 804 and a shaft 820 for driving a turbine 822 and a compressor 824 at a different rotational speed ratio from the heat engine 802 and electric motor 802 when the clutch 844 is engaged. The shaft 820 for driving the turbine 822 and compressor 824 is connected to a turbine driver motor 834 to drive the turbine 822 and compressor 824 independently from the heat engine 802 and electric motor 806 when the clutch 844 is disengaged. The broken lines in FIG. 10 schematically indicate that the positions of the clutch 844 and the turbine gearbox 818 can be switched. The clutch 844 can prevent electrical losses at steady state because the clutch engages when system 800 steady state operation, e.g., cruising in level flight, so the shaft 820 is connected to the heat engine 802 to avoid electrical conversion losses. In transients, the clutch 844 can open or disconnect to allow the motor 834 to drive the shaft 820 at a different speed ratio from the heat engine 802 as described above.

Figure 11:
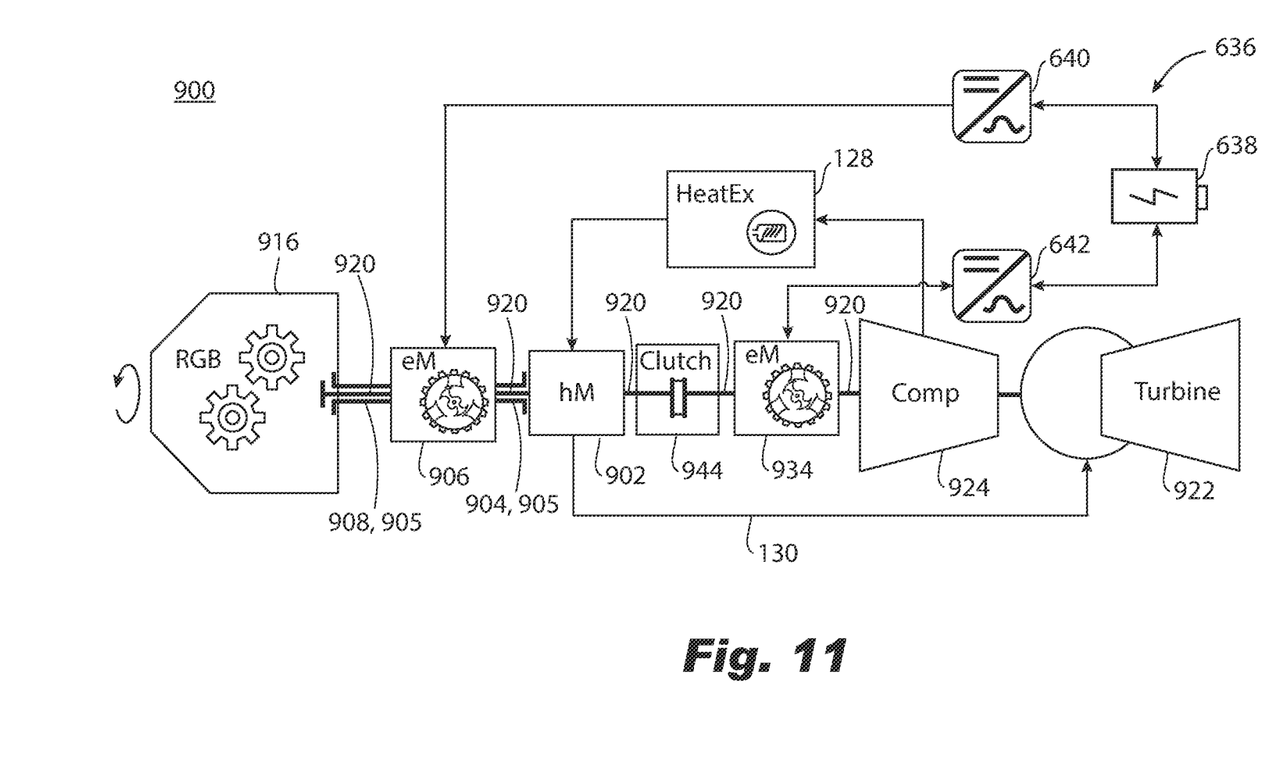
FIG. 11 is a schematic view of an exemplary embodiment of a hybrid propulsion system constructed in accordance with the present disclosure, showing an eleventh gearbox arrangement.

With respect to FIG. 11, a system 900 includes a heat engine shaft 904 and electric motor shaft 908 that are concentric with the shaft 20 for rotation of the turbine 922 and compressor 924 similar to the arrangement in FIG. 5. A reduction gearbox 916 is connected to each of the heat engine shaft 904 and the electric motor shaft 908, e.g., as a common shaft 905 or concentric with one another as described above with respect to FIG. 5. A clutch 944 in the shaft 920 connects between the heat engine 902 and a turbine driver motor 934 for rotating the turbine 922 and compressor 924 with the reduction gear box 916 when the clutch 944 is engaged, and to drive the turbine 922 and compressor 924 independently from the heat engine 902 and electric motor 906 when the clutch 944 is disengaged.

Figure 12:
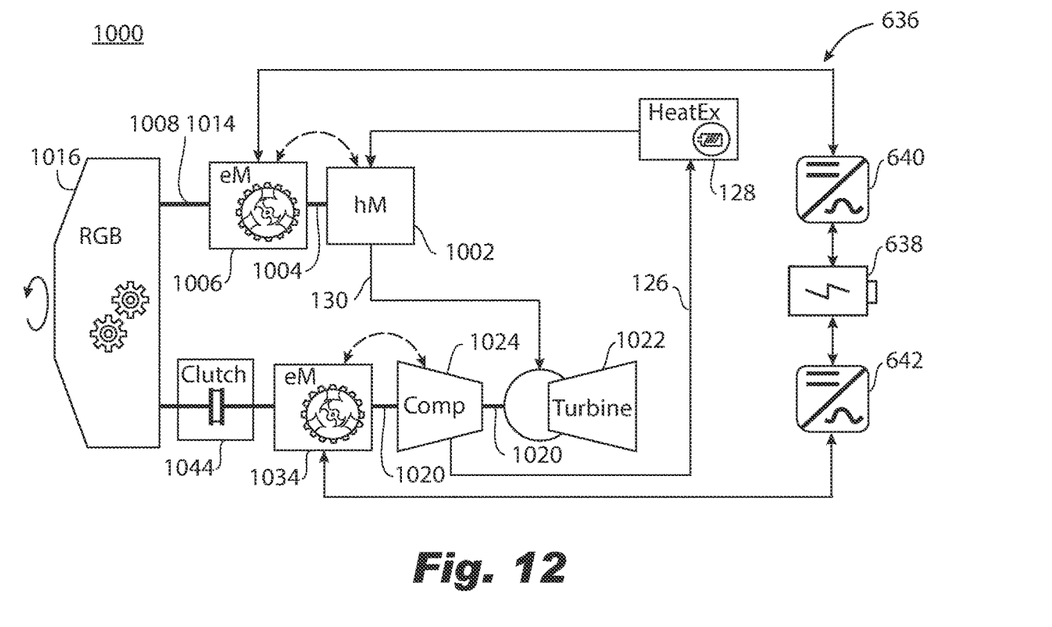
FIG. 12 is a schematic view of an exemplary embodiment of a hybrid propulsion system constructed in accordance with the present disclosure, showing a twelfth gearbox arrangement.

With reference now to FIG. 12, a system 1000 includes a heat engine shaft 1004 and electric motor shaft 1008 are connected for common rotation. A reduction gearbox 1016 is connected to a common output shaft 1014 of the electric motor 1006 and the heat engine 1002. The upper broken lines in FIG. 12 schematically indicate that the positions of the heat engine 1002 and the motor 1006 can be switched on the shaft 1014. A clutch 1044 connects between the reduction gearbox 1016 and a turbine driver motor 1034 connected to a shaft 1020 for driving a turbine 1022 and a compressor 1024 with rotational power from the heat engine 1002 and electric motor 1002 (through the reduction gearbox 1016) when the clutch 1044 is engaged, and to drive the turbine 1022 and compressor 1024 independently from the heat engine 1002 and electric motor 1006 when the clutch 1044 is disengaged. The lower broken line in FIG. 12 schematically indicates that the positions of the motor 1034 and the compressor 1024 can be switched on the shaft 1020.

Referring now to FIG. 13, a system 1100 is shown wherein the heat engine shaft 1104 and the electric motor shaft 1108 are connected for common rotation. A combining gearbox 1112 connects to a common output shaft 1105 of the electric motor 1106 and the heat engine 1102, and to a shaft 1114 of a turbine 1122 to combine rotational input power from the heat engine 1102, electric motor 1106, and turbine 1122 for providing rotational output power to an output shaft 1114. A reduction gearbox 1116 is connected to the output shaft 1114, wherein a compressor 1124 is connected to be driven on the output shaft 1114. An electrical system 1136 includes a storage 1138 connected through an inverter/rectifier component 1140 to supply power to the motor 1106, or to recover power from the motor 1106 in a generator mode to store in the storage 1138. The other arrangements described above that do not specifically show an electrical system can include a system similar to electrical system 1136, and FIG. 14 includes a similar system 1136 even though the details are not repeated. The compressor 1124 can also be connected to the reduction gearbox 1116 on its own shaft concentric with the shaft 1114, much as described below with respect to FIG. 14. The broken lines in FIG. 13 indicate that optionally the turbine 1122 can be mechanically decoupled from the CGB to drive a generator 1134, which can be connected through an inverter/rectifier component 1142 to charge the storage 1138, which can similarly be applied to other arrangements disclosed herein with the turbine decoupled from the compressor. As indicated by broken lines in FIG. 13, the compressor and a gear box 1118 can be connected to the heat engine 1102 in lieu of connecting the compressor 1124 on the output shaft 1114.

Figure 14:
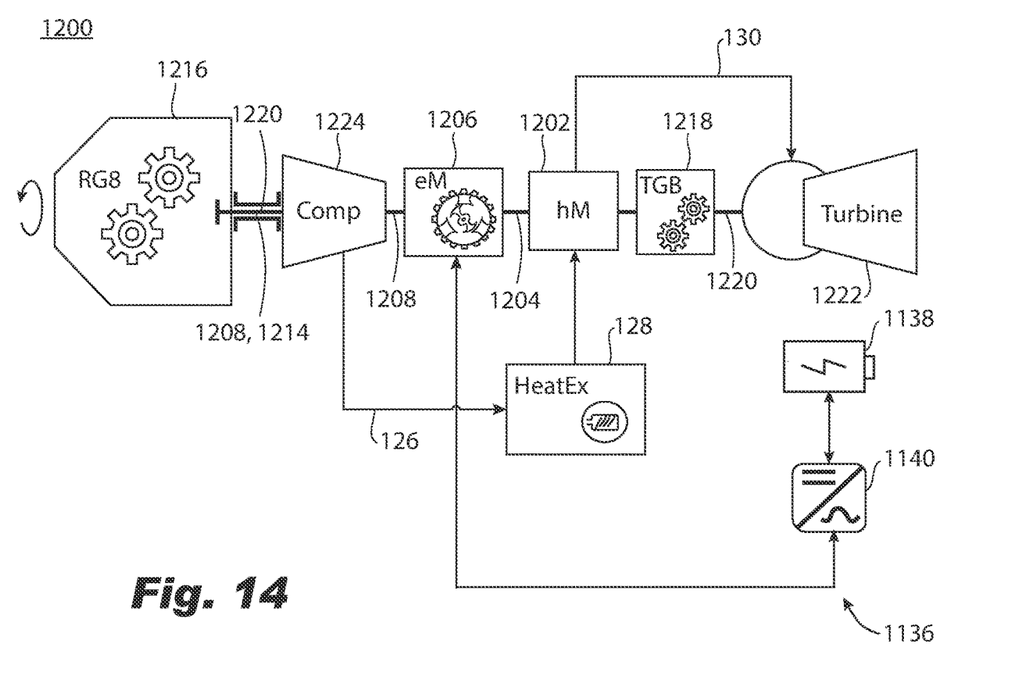
FIG. 14 is a schematic view of an exemplary embodiment of a hybrid propulsion system constructed in accordance with the present disclosure, showing a fourteenth gearbox arrangement.

With reference now to FIG. 14, a system 1200 is shown wherein the heat engine shaft 1204 and the electric motor shaft 1208 are connected for common rotation. A reduction gearbox 1216 connected to a common output shaft 1214 of the electric motor 1206 and the heat engine 1202. A turbine gearbox 1218 is connected between the heat engine shaft 1204 and a shaft 1220 of a turbine 1222 so the turbine can rotate at a different rotational speed from the heat engine 1202 and electric motor 1206. A compressor 1224 is connected to the reduction gearbox 1216 through a compressor shaft 1246 concentric with the common output shaft 1214 so the compressor can be driven at a different speed from the common output shaft 1214.

Figure 15:
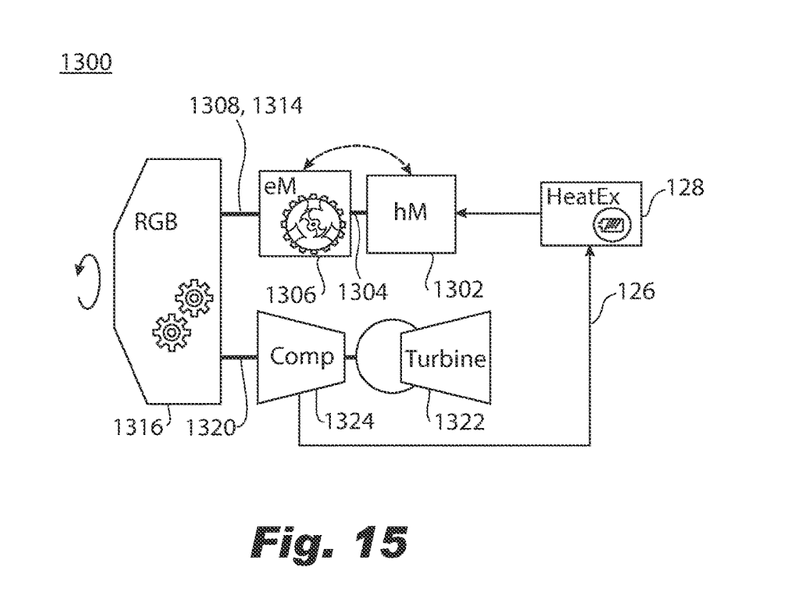
FIG. 15 is a schematic view of an exemplary embodiment of a hybrid propulsion system constructed in accordance with the present disclosure, showing a fifteenth gearbox arrangement.

Referring now to FIG. 15, a system 1300 includes a heat engine shaft 1304 and the electric motor shaft 1308 that are connected for common rotation. A super position gearbox 1316 connects to a common output shaft 1314 of the electric motor 1306 and the heat engine 1302, and to a shaft 1320 for driving a turbine 1322 and compressor 1324 to combine rotational input power from the heat engine 1302 and electric motor 1306 for providing rotational output power to an output shaft 1314 and to drive the turbine 1322 and compressor 1324. The super position gearbox 1316 is configured so the speed ratio between the common output shaft 1314 and the shaft 1320 for driving the turbine 1322 and compressor 1324 can vary, e.g., to adjust the speed of the compressor 1324 for altitude or for ground idle.

The turbine 1322 can optionally be decoupled from the compressor 1324 to drive a generator as described above with reference to FIG. 13. Similarly, the arrangement in FIG. 3 can be modified so the turbine 222 is decoupled from the compressor 224 to drive a generator. The heat engine, e.g., heat engine 202 in FIG. 2, can be split and connected on opposite sides of the respective gear box, e.g., the combined gearbox 212 in FIG. 2, as indicated in FIG. 2 with the broken line box 202. This split can be applied to other arrangements above besides the one in FIG. 2. Disconnect clutches or mechanism, e.g., clutch 844 in FIG. 10, can be included, e.g., in each of the shafts 104 and 108 as indicated in FIG. 1 by the broken lines crossing the shafts 104 and 108, for disconnecting the heat engine 102 or electric motor 106 as needed. This can also be applied to other embodiments disclosed above besides the arrangement in FIG. 1.

Even if modules are represented schematically herein vertically on top of each other, those skilled in the art having the benefit of this discourse will readily appreciate that they can be located side by side, one above the other or in any geometrical arrangement and in any order in physical implementations. Similarly, those skilled in the art having had the benefit of this disclosure will readily appreciate that modules represented on one side (right or left) of the respective gearbox herein can also potentially be installed on the other side or even trapped between a respecting reduction gearbox and combining gear box. Module disclosed herein can be installed directly on the respective combining gear box or reduction gear box with a proper speed ratio. Although modules are represented herein with an axial orientation, those skilled in the art having the benefit of this disclosure will readily appreciate that the use of bevel gears (or other mechanical or electrical devices) allows the installation of modules in any suitable orientation. Those skilled in the art having the benefit of this disclosure will readily appreciate that accessories not explicitly represented herein can be included and can potentially be connected mechanically to any module or driven electrically similar to the modules and components disclosed herein. Those skilled in the art having had the benefit of this disclosure will readily appreciate that combining gearboxes and reduction gearboxes disclosed above can be combined into a single respective gearbox. Finally, those skilled in the art having had the benefit of this disclosure considering the number of parts, will readily appreciate that each architecture disclosed herein can be recombined with other architectures disclosed herein to results in dozens of additional configurations, several examples of which are described above, and all of which are within the scope of this disclosure.

The methods and systems of the present disclosure, as described above and shown in the drawings, provide for propulsion systems with superior properties including use of hybrid heat engine and electric motor power. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hybrid propulsion system comprising:
   a heat engine configured to drive a heat engine shaft;
   an electric motor configured to drive an electric motor shaft; and
   a transmission system connected to receive rotational input power from each of the heat engine shaft and the electric motor shaft, wherein the transmission system is configured to convert the rotational input power to output power;
   wherein the heat engine shaft and the electric motor shaft are concentric with a shaft for rotation of a turbocharger component of the heat engine.

2. The system as recited in claim 1, wherein the transmission system includes:
   a turbine gearbox connected between the heat engine shaft and the shaft for driving the turbocharger component of the heat engine at a different rotational speed from the heat engine.

3. The system as recited in claim 1, wherein the transmission system includes:
   a combining gearbox connecting to:
      the heat engine shaft;
      the electric motor shaft; and
      the shaft for driving the turbocharger component of the heat engine, wherein the transmission system is configured to combine the rotational input power from the heat engine and the electric motor for providing rotational output power to an output shaft and to drive the turbocharger component.

4. The system as recited in claim 3, wherein one and only one of:
   the turbocharger component includes a turbine and a compressor that are both on one side of the combining gearbox; or
   the turbine and compressor are connected on opposite sides of the combining gearbox.

5. The system as recited in claim 1, wherein the heat engine shaft and the electric motor shaft are connected for common rotation and wherein the transmission system includes:

a turbine gearbox connected between the heat engine shaft and the shaft for driving a turbocharger component of the heat engine to drive the turbocharger component at a different rotational speed from the heat engine and the electric motor.

6. The system as recited in claim 1, wherein the heat engine shaft and the electric motor shaft are connected for common rotation, and wherein the transmission system includes:
 a combining gearbox connecting to:
  a common output shaft of the electric motor and the heat engine; and
  the shaft for driving the turbocharger component of the heat engine,
 wherein the transmission system is configured to combine the rotational input power from the heat engine and electric motor for providing rotational output power to an output shaft and to drive the turbocharger component.

7. The system as recited in claim 6, wherein one and only one of:
 the turbocharger component includes a turbine and a compressor are both on one side of the combining gearbox; or
 the turbine and compressor are connected on opposite sides of the combining gearbox.

8. The system as recited in claim 1, further comprising a turbocharger component driver motor connected to the shaft for driving the turbocharger component of the heat engine to drive the turbocharger component at a different rotational speed ratio from the heat engine and the electric motor.

9. The system as recited in claim 1, wherein the heat engine shaft and the electric motor shaft are connected for common rotation and further comprising a turbocharger component driver motor connected to the shaft for driving the turbocharger component of the heat engine to drive the turbocharger component at a different rotational speed ratio from the heat engine and the electric motor.

10. The system as recited in claim 1, wherein the heat engine shaft and the electric motor shaft are connected for common rotation and wherein the transmission system includes:
 a turbine gearbox connected through a clutch between the heat engine shaft and the shaft for driving the turbocharger component of the heat engine to drive the turbocharger component at a different rotational speed from the heat engine and electric motor when the clutch is engaged, wherein the shaft for driving the turbocharger component is connected to a turbocharger component driver motor to drive the turbocharger independently from the heat engine and the electric motor when the clutch is disengaged.

11. The system as recited in claim 1, further comprising:
 a clutch in the shaft for rotation of the turbocharger component to drive the turbocharger component independently from the heat engine and the electric motor when the clutch is disengaged.

12. The system as recited in claim 1, wherein the heat engine shaft and the electric motor shaft are connected for common rotation and further comprising a clutch connected a turbocharger component driver motor connected to the shaft for driving the turbocharger component of the heat engine to drive the turbocharger component with rotational power from the heat engine and electric motor when the clutch is engaged, and to drive the turbocharger component independently from the heat engine and electric motor when the clutch is disengaged.

13. The system as recited in claim 1, wherein the heat engine shaft and the electric motor shaft are connected for common rotation, and wherein the transmission system includes:
 a combining gearbox connecting to:
  a common output shaft of the electric motor and the heat engine; and
  the shaft of the turbocharger component of the heat engine,
 wherein the transmission system is configured to combine the rotational input power from the heat engine, electric motor, and turbine for providing rotational output power to an output shaft; and
 wherein a compressor of the turbocharger component is connected to be driven on the output shaft.

14. The system as recited in claim 1, wherein the heat engine shaft and the electric motor shaft are connected for common rotation and wherein the transmission system includes:
 a turbine gearbox connected between the heat engine shaft and the shaft of the turbocharger component of the heat engine so a turbine of the turbocharger component can rotate at a different rotational speed from the heat engine and electric motor, wherein a compressor of the turbocharger is connected to a compressor shaft concentric with the common output shaft.

15. The system as recited in claim 1, wherein the heat engine shaft and the electric motor shaft are connected for common rotation, and wherein the transmission system includes:
 a gearbox connecting to:
  a common output shaft of the electric motor and the heat engine; and
  the shaft of the turbocharger component of the heat engine,
 wherein the transmission system is configured to combine the rotational input power from the heat engine and electric motor for providing rotational output power to an output shaft and to drive a turbine and a compressor of the turbocharger component, wherein the gearbox is configured so speed ratio between the common output shaft and the shaft for driving the turbine and the compressor can vary.

16. The system as recited in claim 1, wherein the turbocharger component comprises a turbine fluidly connected to the heat engine to be driven by exhaust form the heat engine, and a generator connected to be driven by the turbine.

* * * * *

UNITED STATES PATENT AND TRADEMARK OFFICE
CERTIFICATE OF CORRECTION

| | | |
|---|---|---|
| PATENT NO. | : 12,071,256 B2 | Page 1 of 1 |
| APPLICATION NO. | : 18/086376 | |
| DATED | : August 27, 2024 | |
| INVENTOR(S) | : Eric LaTulipe et al. | |

It is certified that error appears in the above-identified patent and that said Letters Patent is hereby corrected as shown below:

On the Title Page

Item (72) The first name of the third inventor should read "Xi" rather than "Xiaoqin".

Signed and Sealed this
Eighteenth Day of November, 2025

John A. Squires
*Director of the United States Patent and Trademark Office*